(12) United States Patent
Wu et al.

(10) Patent No.: US 7,265,439 B1
(45) Date of Patent: Sep. 4, 2007

(54) LOW COST, HIGH SPEED, HIGH EFFICIENCY INFRARED TRANSCEIVER

(75) Inventors: Melinda W. Wu, Sunnyvale, CA (US); Carl Embry, Boulder, CO (US); Yman Teng, Saratoga, CA (US); Ron Kaneshiro, Mountain View, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 09/452,036

(22) Filed: Nov. 30, 1999

(51) Int. Cl.
*H01L 23/02* (2006.01)

(52) U.S. Cl. .................. 257/678; 372/101; 359/152

(58) Field of Classification Search .............. 372/23, 372/38.1, 101, 50.1; 359/10, 159, 117, 118, 359/477; 356/477; 438/116; 398/128
See application file for complete search history.

(56) References Cited

U.S. PATENT DOCUMENTS

| | | | | |
|---|---|---|---|---|
| 4,839,884 | A | | 6/1989 | Schloss ........................ 370/3 |
| 5,118,924 | A | * | 6/1992 | Mehra et al. ................ 257/659 |
| 5,341,229 | A | * | 8/1994 | Rowan ........................ 359/10 |
| 5,519,526 | A | * | 5/1996 | Chua et al. .................. 359/118 |
| 5,663,944 | A | * | 9/1997 | Mun .......................... 369/121 |
| 5,793,912 | A | * | 8/1998 | Boord et al. .................. 385/37 |
| 5,912,751 | A | * | 6/1999 | Ford et al. .................. 359/117 |
| 5,917,625 | A | * | 6/1999 | Ogusu et al. ................ 359/124 |
| 5,923,452 | A | * | 7/1999 | Carlson ...................... 359/159 |
| 5,946,281 | A | * | 8/1999 | Ito et al. ................. 369/112.07 |
| 5,978,401 | A | * | 11/1999 | Morgan .................... 372/50.21 |
| 6,157,476 | A | * | 12/2000 | Angerstein et al. ......... 398/135 |
| 6,169,295 | B1 | * | 1/2001 | Koo ............................ 257/81 |
| 6,256,328 | B1 | * | 7/2001 | Delfyett et al. ................ 372/23 |
| 6,297,897 | B1 | * | 10/2001 | Czichy et al. .............. 359/159 |
| 6,323,949 | B1 | * | 11/2001 | Lading et al. .............. 356/477 |
| 6,509,992 | B1 | * | 1/2003 | Goodwill ..................... 398/131 |
| 6,590,152 | B1 | * | 7/2003 | Horio et al. ........... 174/35 GC |
| 6,635,955 | B2 | * | 10/2003 | Scheidle ..................... 257/678 |
| 6,656,528 | B2 | * | 12/2003 | Ouellet et al. .............. 427/307 |
| 6,754,243 | B2 | * | 6/2004 | Missey et al. ................ 372/20 |
| 6,829,286 | B1 | * | 12/2004 | Guilfoyle et al. ........... 372/108 |

FOREIGN PATENT DOCUMENTS

DE            25 33 697            2/1977

(Continued)

OTHER PUBLICATIONS

C. Degen, et al., "Transverse Modes in Oxide Confined VCSELs: Influence of Pump Profile, Spatial Hole Burning, and Thermal Effects", Optics Express, vol. 5, No. 3, pp. 38-47, Aug. 2, 1999.

(Continued)

*Primary Examiner*—Minsun Oh Harvey
*Assistant Examiner*—Tuan N. Nguyen

(57) ABSTRACT

An inventive transceiver includes a transmitter for outputting plural beams of electromagnetic energy. In the illustrative embodiment, the transmitter is a vertical cavity surface emitting laser. Plural beams output by the transmitter are directed to the detector by an array of diffractive optical elements. In the preferred embodiment, the optical elements are fabricated by imprinting a pattern on a high temperature film substrate using an ultraviolet epoxy. The use of a vertical cavity surface emitting laser allows for high data rates while the diffractive optical arrangement allows for a compact design.

25 Claims, 4 Drawing Sheets

FOREIGN PATENT DOCUMENTS

| | | |
|---|---|---|
| DE | 43 14 739 A1 | 11/1993 |
| DE | 689 22 574 T2 | 9/1995 |
| DE | 692 18 569 T2 | 11/1997 |
| GB | 1581025 | 12/1980 |
| GB | 2284488 A | 2/1994 |
| WO | WO01/05072 A1 | 1/2001 |

OTHER PUBLICATIONS

"Basic Notes Laser Diodes", Profile Optische Systems GmbH, Profile, Inc., BN 1000, May 2000.

English translation of German Office Action dated May 24, 2002; German Patent Application No. 100 58 949.9-55.

* cited by examiner

36

LOW COST, HIGH SPEED, HIGH EFFICIENCY INFRARED TRANSCEIVER

BACKGROUND OF THE INVENTION

1. Field of the Invention

The present invention relates to communication systems. More specifically, the present invention relates to infrared transceivers used for communication between devices.

2. Description of the Related Art

Infrared transceivers are used for communication applications between devices such as portable computers, handheld personal digital assistant products such as "Palm Pilot" devices, cellular telephones, printers, organizers, calculators and other portable devices. For these applications, size, cost and operating speed are of paramount concern.

Current state of the art infrared transceivers typically use an integrated circuit (IC) which controls a light-emitting diode (LED). Light emitted by the LED travels over free space and is coupled by refractive optics to a PIN diode for detection. The IC chips are die attached, wire bonded either to a metal lead frame or an organic substrate printed circuit board (PCB), and encapsulated in plastic. The encapsulating plastic is often shaped into a lens for the LED and PIN diode detector.

As is known in the art, the use of light emitting diodes currently limits the data rate of the conventional transceiver to approximately 16 megabits per second (Mb/s). Unfortunately, for current applications, there is a need for transceivers capable of operating at higher data rates.

In addition, as mentioned above, size is also a critical factor for most IR transceiver applications. This, in turn, requires small components. However, efforts to reduce the size of conventional IR transceivers have been hampered by the need for refractive lenses to shape and direct the output beam.

Accordingly, a need exists in the art for a compact, low-cost infrared transceiver capable of operating at higher data rates relative to conventional infrared transceivers.

SUMMARY OF THE INVENTION

The need in the art is addressed by the teachings of the present invention which provide a method and apparatus for focusing multiple beams output by a high data rate transmitter. In an illustrative transceiver implementation, a transmitter is provided for outputting plural beams of electromagnetic energy. The transmitter is preferably a vertical cavity surface emitting laser. Multiple beams output by the laser are directed to a detector by an array of diffractive optical elements. In the preferred embodiment, the optical elements are fabricated by imprinting a pattern on a high temperature film substrate using an ultraviolet curable epoxy.

The use of a vertical cavity surface emitting laser allows for high data rates while the diffractive optical arrangement allows for a compact design.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
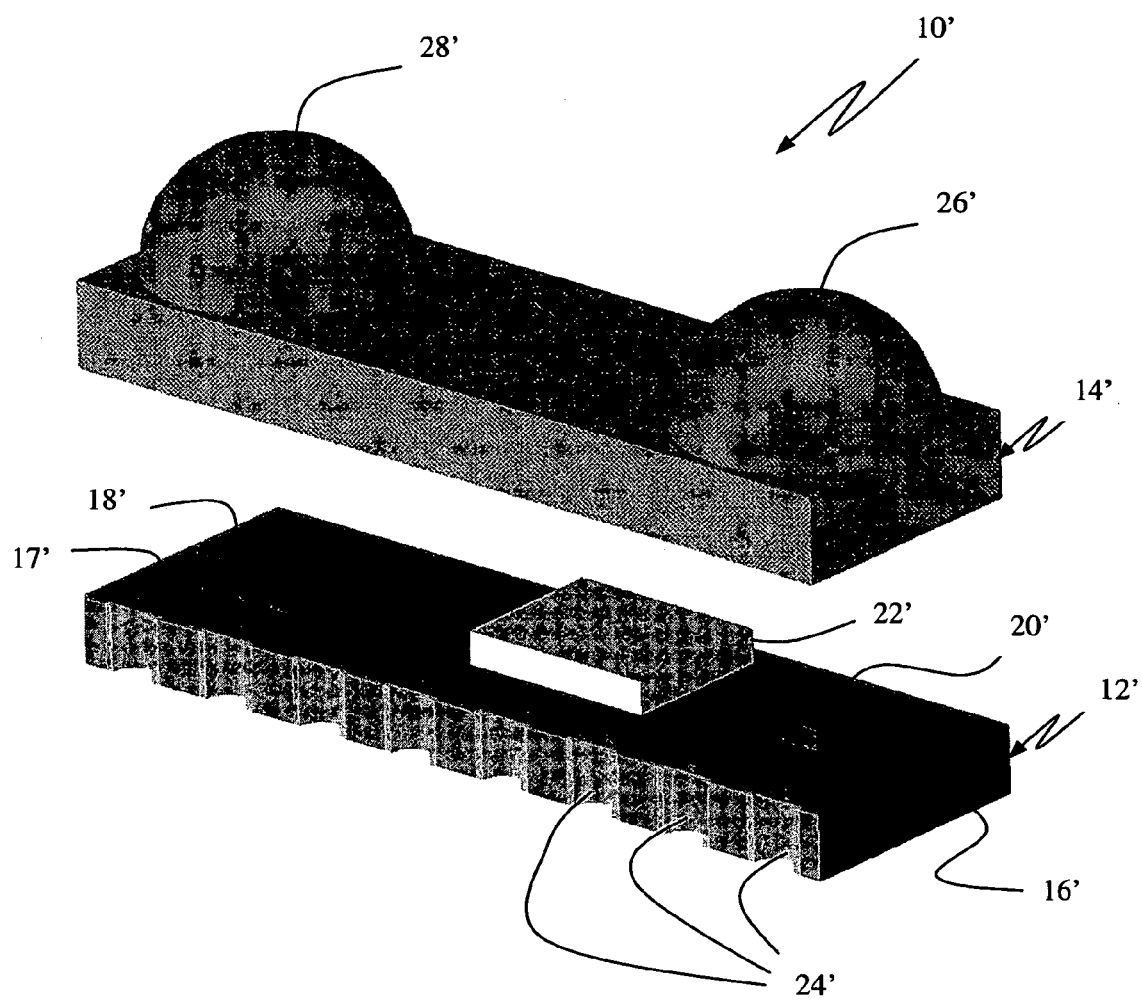
FIG. 1 is a perspective view of an infrared transceiver assembly constructed in accordance with conventional teachings in disassembled relation.

FIG. 1 is a perspective view of an infrared transceiver assembly in disassembled relation constructed in accordance with conventional teachings. As shown in FIG. 1, the conventional infrared transceiver assembly 10' typically includes a transceiver 12' and an optical arrangement 14'. The transceiver 12' includes a substrate 16' which is typically either of ceramic, printed circuit board, or molded interconnect device construction. A receiver 18' and a transmitter 20' are disposed on an upper surface 17' of the substrate 16' along with an integrated circuit 22'. The receiver 18' is typically implemented with a PIN diode detector. The transmitter 20' is typically implemented with a light emitting diode (LED). The receiver 18' and transmitter 20' are managed by a controller disposed within the integrated circuit (IC) 22' via conductive traces not shown in FIG. 1.

Those skilled in the art will appreciate that, in practice, two transceiver assemblies would be required, one in each device, in order for two devices to communicate with one another. In the event; if the transceiver 10' were mounted in a first device, such as a printer, the transmitter 20' thereof would output a single beam. This beam would be focused by a refractive optical element 26' in the optical arrangement 14' onto a receiver mounted in a second device such as a desktop computer.

The design of the refractive optical element 26' would be relatively simple for one of ordinary skill in the art inasmuch as the LED of the transmitter 20' would output a single infrared beam. Infrared energy received by the transceiver assembly 10' would be focused by a second refractive optical element 28' onto the receiver detector 18'. The distance at which the beam from the LED should be focused and the optical output thereof would dictate the design of the refractive optical element 26'.

As mentioned above, the speed of the conventional infrared transceiver assembly 10' is limited by the use of an LED in the transmitter 20'. In addition, the size and form factor of the unit 10' is limited by the requirement for two dome-shaped refractive optical elements 26' and 28'. Accordingly, a need has existed in the art for a compact, low-cost alternative infrared transceiver design capable of operating at higher data rates relative to conventional infrared transceivers. The need in the art is addressed by the infrared transceiver of the present invention.

Figure 2:
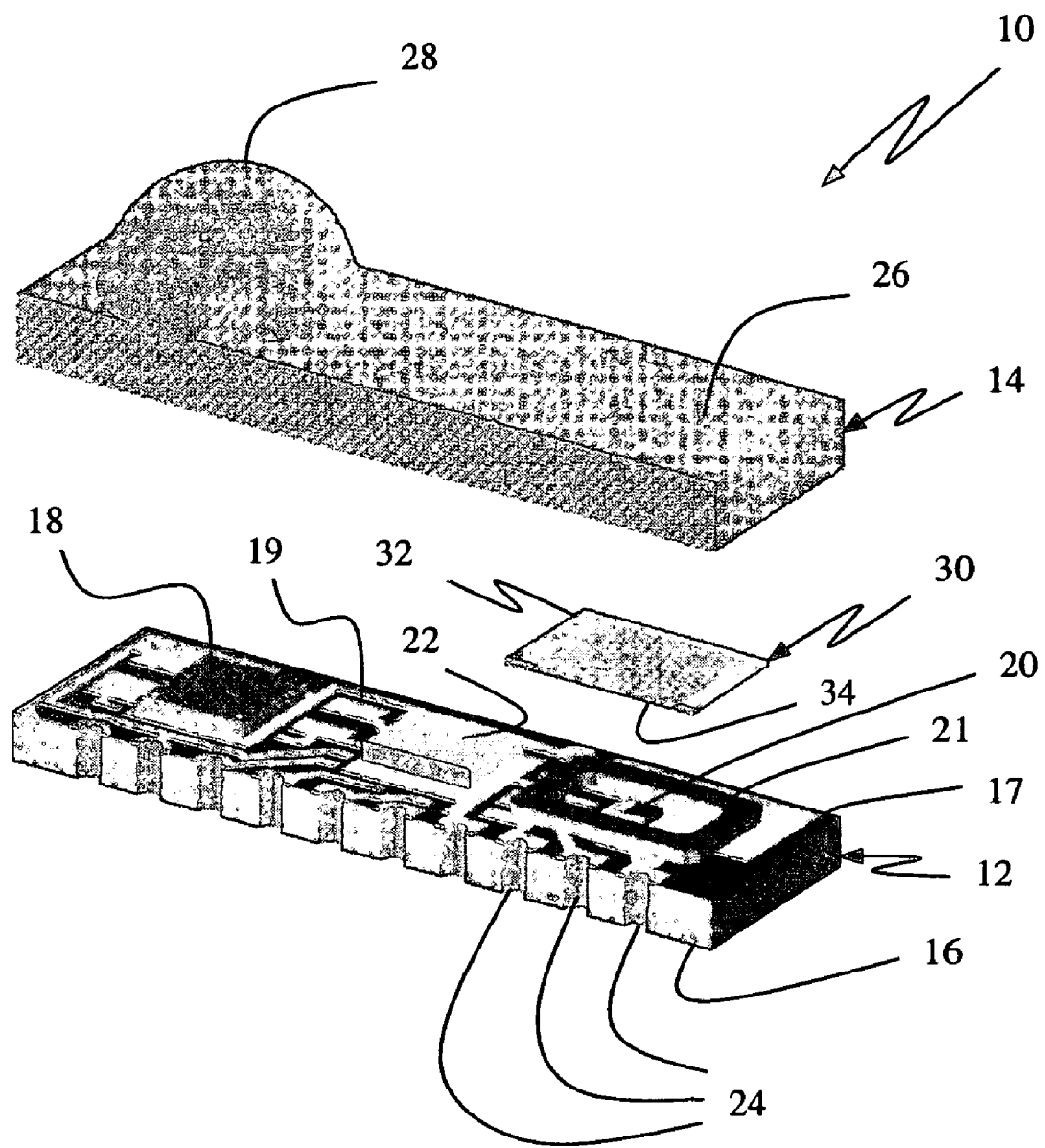
FIG. 2 is a perspective view of an infrared transceiver assembly constructed in accordance with the teachings of the present invention in disassembled relation.

FIG. 2 is a perspective view of an infrared transceiver assembly constructed in accordance with the teachings of the present invention in disassembled relation. As shown in FIG. 2, the infrared transceiver assembly 10 of the present invention includes a transceiver 12 and an optical arrangement animal with a cover 14 as per the conventional transceiver assembly 10' of FIG. 1. The transceiver 12 includes a substrate 16 which, as per conventional teachings, is constructed of ceramic, printed circuit board, molded interconnect device or other suitable material. A receiver 18 and a transmitter 20 are disposed on an upper surface 17 of the substrate 16 along with an integrated circuit 22. The receiver 18 is typically implemented with a PIN diode detector as per conventional teachings.

However, in accordance with present teachings, the transmitter 20 is implemented with a device capable of much higher data rates than LED of the transmitter 20' of FIG. 1. In the preferred embodiment, the transmitter 20 is implemented with a VCSEL (Vertical Cavity Surface Emitting Laser). Nonetheless, the invention is not limited to the use of a VCSEL. Those skilled in art will appreciate that a microwave or radio frequency transmitter may be used without departing from the scope the present teachings.

VCSELs are known in the art and currently commercially available from such vendors as Honeywell and Vitesse. VCSELs are capable of much higher data rates and typically output plural (e.g., four) beams. Unfortunately, it has heretofore been difficult and expensive to focus plural beams with refractive optics. This may account for the fact that VCSELs have not been known by the applicants to be used for the illustrative applications.

In accordance with the present teachings, a novel diffractive optical arrangement 30 is used to focus the output beams of the VCSEL laser. As shown in FIG. 2, the diffractive optical arrangement 30 includes an organic substrate 32 on which a pattern 34 is imprinted. While the organic substrate 32 may be any organic plastic film with suitable optical properties, in the preferred embodiment, a Kapton (polyimid) film is used for this purpose. Diffraction of the beams output by the VCSEL 20 is provided by a pattern 34 consisting of a matrix or array of elements 36 imprinted on the film 32.

In the illustrative embodiment, the diffractive pattern is created using a software product called DIFFRACT by Hewlett Packard. However, other programs and techniques for creating diffractive patterns may be used without departing from the scope of the present teachings. The pattern is designed to shape the output optical beam in order to meet the requirements of a given application.

The computer-generated pattern is then etched onto a suitable master with an ion beam or with another suitable manufacturing technique. The pattern 34 is then imprinted into an ultraviolet (UV) epoxy disposed on the organic substrate film. The pattern 34 is then cured using ultraviolet light.

Those skilled in the art will appreciate that the teachings of the present invention are not limited to the computer program used to create the diffractive pattern, the type of material on which the master is created, nor the manner by which the master is created. Further, the teachings of the present invention are not limited to the manner by which the pattern 34 is imprinted on the substrate 32.

Figure 3:
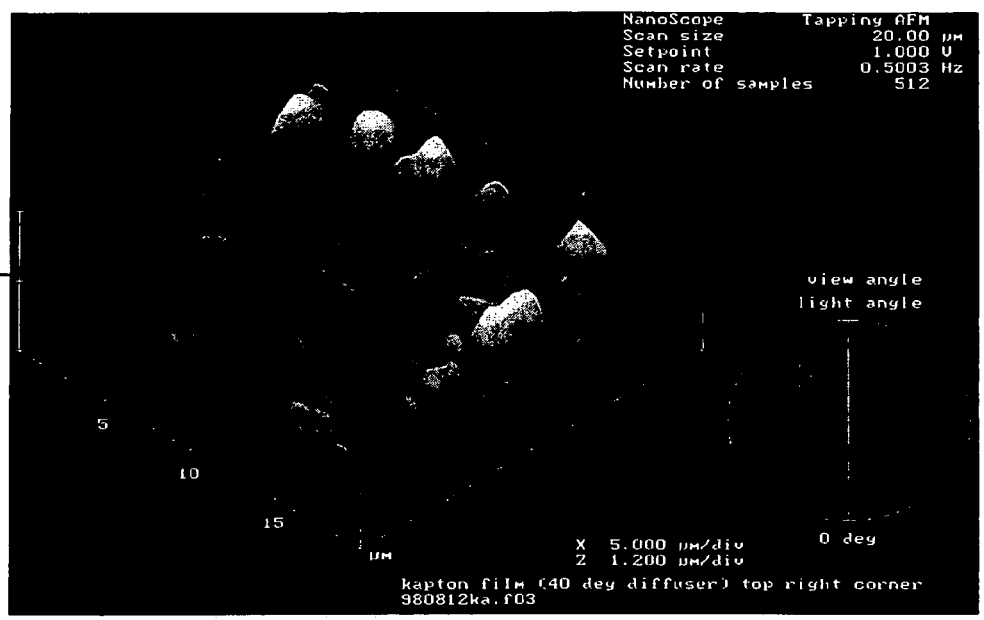
FIG. 3 is a perspective view with high magnification of an image from an atomic force microscope showing the micron-sized features of a single element utilized in the pattern of the diffractive optical element of the transceiver of the present invention.

FIG. 3 is a perspective view with high magnification of an image from an atomic force microscope showing the micron-sized features of a single element 36 utilized in the pattern 34 of the diffractive optical arrangement 30 of the transceiver of the present invention. In the illustrative embodiment, the pattern 34 is comprised of a single optical element 36, which is repeated throughout the entire array. The diffractive optical arrangement 30 is designed to be tolerant of moderate changes in the far field pattern of the VCSEL 20 such that it does not require collimating optics. The diffractive optical arrangement 30 converts the VCSEL 20's multimode far field pattern into a uniform profile that cannot be achieved with conventional optics. Beam shaping is performed by a single optical surface. This significantly reduces the size of the transceiver 10. In addition, the diffractive optical arrangement 30 should be designed to be advantageous from standpoint of eye safety in that it should not allow full imaging of the VCSEL 20.

In accordance with present teachings, plastic is cast over the diffractive pattern 34 which, in turn, is cast/embossed on the organic substrate 32 to protect it from high temperatures during the surface mount process that infrared transceivers typically must withstand in the process of manufacturing the products and devices in which they are used.

Returning to FIG. 2, the transmitter 20 is disposed within a standoff structure or base 21. The diffractive optical arrangement 30 is epoxied to the base 21 grating side down. Accordingly, the base 21 serves to support the diffractive optical arrangement 30 above the transmitter 20. Accordingly, an air gap is provided which provides a protective air interface between the transmitter 20 and the diffractive optical arrangement 30. The base 21 may be any nonmetallic material such as printed circuit board, ceramic, or plastic by way of example. Input and output electrical connections are facilitated via a plurality of castellations 24.

The receiver 18 and transmitter 20 are controlled by a controller (not separately shown) disposed within the integrated circuit (IC) 22 via conductive traces 19. The photodetector 18, semiconductor laser 20, and controlling integrated circuit 22 are die attached and wire bonded to the printed circuit board (PCB) substrate 16. The entire assembly is then encapsulated in the cover 14 made of plastic or other suitably refractive material. This provides both thermal and mechanical protection as well as a refractive optical surface 28 for the detector 18. Note that the dome 26' of FIG. 1 has been eliminated and replaced by a planar section 26.

Figure 4:
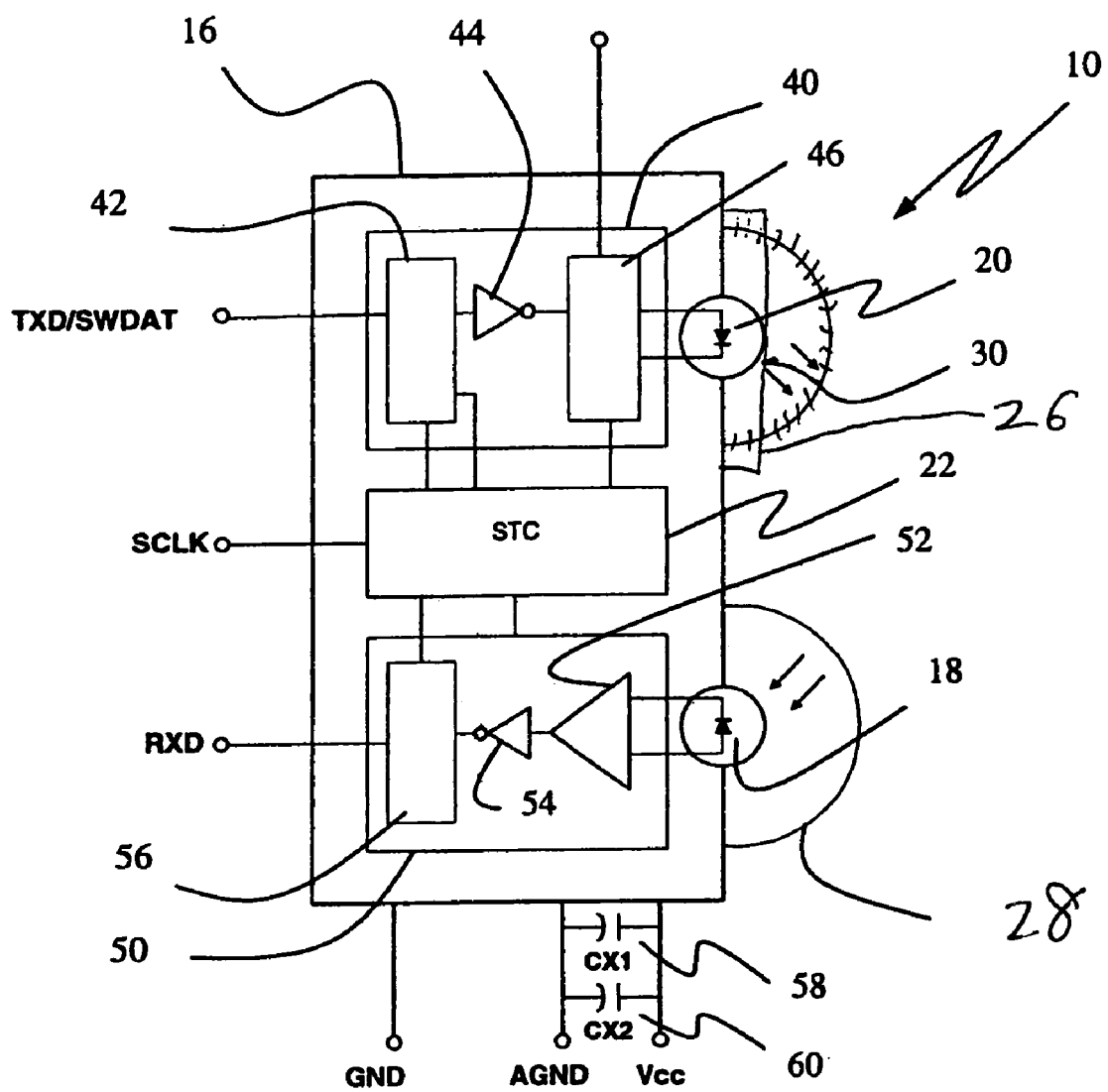
FIG. 4 is a block diagram of the transceiver assembly of the present invention.

FIG. 4 is a block diagram of the transceiver assembly 10 of the present invention. The assembly 10 has a transmit circuit 40 and a receive circuit 50. The transmit circuit 40 includes a signal processor circuit 42, an inverter 44, and an amplifier 46. As shown in FIG. 4, a transmit signal TXD/SWDAT is provided to the signal processor 42. The output of the signal processor 42 is inverted by the inverter 44 and applied to the amplifier 46. The amplifier 46 applies an analog voltage to the transmitter 20, which, in accordance with present invention, is a VCSEL as discussed above. The beams output by the transmitter 20 are focused by the diffractive optical arrangement 30.

The receive circuit 50 includes an amplifier 52, a quantizer 54, and a second signal processing circuit 56. Infrared energy received by the assembly 10 is detected and converted into an electrical signal by the infrared detector 18. The amplifier 52 amplifies the output of the detector 18. This signal is thresholded and applied to the second signal processor 56. A receive signal RXD is then output by the second signal processor 56. First and second capacitors 58 and 60 are provided to protect the transceiver from high frequency noise as is common in the art.

Those skilled in the art will appreciate that the use of a vertical cavity surface emitting laser allows for high data rates while the diffractive optical arrangement of the present invention allows for a compact design.

The invention may be implemented in a transceiver having diffractive emitter and detector optics. The diffractive optical elements could be either molded or embossed (on film or glass) on a lid to be placed over a molded "wall" on a print circuit board. An air cavity module could be insert molded on the lead frame with molded or embossed lid diffractive optical element. As an alternative to a printed circuit board, an etched or stamped copper leadframe may be used as a substrate. Plastic may be molded over the leadframe to create a desired air cavity for the VCSEL. Also, the diffractive pattern may be cast directly onto the "lid" feature 14' (FIG. 2). A flip chip IC, laser, and photodetector may be used for further size reductions. A flip chip is an alternative to wirebonding. Conductive balls are bonded directly to the semiconductor to serve as the link from the semiconductor to the substrate (leadframe, PCB, etc). This design offers additional benefits with respect to size reduction. In addition, the teachings of the present invention may be implemented as an infrared discrete laser transmitter only without an associated photodetector and integrated circuit.

Thus, the present invention has been described herein with reference to a particular embodiment for a particular application. Those having ordinary skill in the art and access to the present teachings will recognize additional modifications applications and embodiments within the scope thereof. For example, the invention may be used not only for communication applications, but also general illumination applications such as for lighting and displays and other applications for which semiconductor lasers may be useful. The teachings of the present invention may be used for any free space optical interconnect application, particularly those requiring the use of semiconductor lasers.

It is therefore intended by the appended claims to cover any and all such applications, modifications and embodiments within the scope of the present invention.

Accordingly,

What is claimed is:

1. A communication transmitter comprising:
    first means for receiving a transmit signal to be transmitted and for outputting plural simultaneous component beams of electromagnetic energy each carrying the transmit signal, the component beams forming a first cross-sectional beam pattern;
    second means including a component-beam transmissive diffractive optical element for receiving said component beams and for generating from the component beams a second cross-sectional beam pattern for transmission, the second pattern being different than the first pattern, the diffractive optical element being separate from and disposed over the first means; and
    a cover disposed over the first means and over the diffractive optical element.

2. The invention of claim 1 wherein said first means is a laser.

3. The invention of claim 2 wherein said first means is a semiconductor laser.

4. The invention of claim 2 wherein said laser is a vertical cavity surface emitting laser.

5. The invention of claim 1 wherein said optical element includes a substrate.

6. The invention of claim 5 wherein said substrate is film.

7. The invention of claim 6 wherein said substrate is high temperature film.

8. The invention of claim 5 wherein said optical element further includes a pattern imprinted on said substrate.

9. The invention of claim 8 wherein said optical element further includes a pattern imprinted on said substrate with an ultraviolet curable epoxy.

10. The invention of claim 1 wherein said first means is an infrared transmitter.

11. The invention of claim 1 wherein said first means is a microwave transmitter.

12. The invention of claim 1 wherein said first means is a radio frequency transmitter.

13. The invention of claim 1 further including third means for detecting electromagnetic energy from another communication transmitter.

14. The invention of claim 13 wherein said third means is a detector.

15. A communications transceiver as recited in claim 1, wherein the diffractive optical element includes a pattern for shaping the output optical beam in order to meet the requirements of a given application.

16. A communications transceiver as recited in claim 1, wherein:
    the first means includes a far field pattern which is subject to moderate changes; and
    the pattern of the diffractive optical element includes means for shaping the output optical beam to be tolerant of the moderate changes in the far field pattern of the first means.

17. A communications transceiver as recited in claim 16, wherein the means for shaping includes an array of repeated pattern elements.

18. A communications transceiver as recited in claim 17, wherein the repeated pattern elements include micron-sized features.

19. The communication transmitter of claim 1 wherein each of the plural simultaneous beams of electromagnetic energy includes a wavelength common to the other plural simultaneous beams of electromagnetic energy.

20. A first communication transceiver for communication with a second communication transceiver, the first communication transceiver comprising:
    a transmitter including a vertical cavity surface emitting laser for receiving a transmit signal to be transmitted to the second communications transceiver, and for providing plural simultaneous modes of light for carrying the transmit signal, the modes of light forming a first cross-sectional beam pattern, the transmitter further comprising a diffractive optical element for shaping said plural simultaneous modes of light into a second cross-sectional beam pattern for transmission to the second communication transceiver, the second pattern being different than the first pattern; and
    a detector disposed to detect beams of electromagnetic energy from said second communication transceiver and provide a receive signal in response thereto;
    wherein no refractive optical element is disposed between the vertical cavity surface emitting laser and the diffractive optical element.

21. The invention of claim 20 wherein said diffractive optical element includes a substrate of high temperature film.

22. The invention of claim 21 wherein said diffractive optical element further includes a pattern imprinted on said substrate.

23. The invention of claim 22 wherein said diffractive optical element further includes a pattern imprinted on said substrate with an ultraviolet curable epoxy.

24. A method for communicating transmit and receive signals in free space between a first communication transceiver having a laser device and a second communication transceiver, the method including the steps of:

provided the transmit signal to the laser device of the first communication transceiver;

simultaneously outputting plural component light beams from the laser device, the component light beams each carrying the transmit signal and forming a first cross-sectional beam pattern;

detecting received electromagnetic energy from the second communication transceiver, the received electromagnetic energy carrying the receive signal; and directing said component light beams from said laser device to a light-transmissive diffractive optical element that is external to said laser device to shape the component light beams into a second cross-sectional beam pattern for transmission to the second communication transceiver, the second pattern being different than the first pattern, there being no refractive optical element between the laser device and the diffractive optical element.

25. A communications transceiver as recited in claim 1, wherein the second means for directing includes means for focusing said plural beams of electromagnetic energy.

* * * * *